June 21, 1955 — L. T. SZADY — 2,711,238

SELF-RELEASING SPRAG FOR ONE-WAY CLUTCHES

Filed March 2, 1953

INVENTOR.
LEOPOLD T. SZADY
BY
*Whittemore Hulbert & Belknap*
ATTORNEYS

United States Patent Office 2,711,238
Patented June 21, 1955

2,711,238

SELF-RELEASING SPRAG FOR ONE-WAY CLUTCHES

Leopold T. Szady, Hamtramck, Mich., assignor to Formsprag Company, Van Dyke, Mich., a corporation of Michigan Application March 2, 1953, Serial No. 339,800

6 Claims. (Cl. 192—45.1)

The invention relates to sprags for one-way clutches and of that type comprising opposite eccentric cam faces for respectively engaging outer and inner concentric raceways of the clutch. Such sprags, when arranged between the raceways, must be energized or biased to turn into frictional contact therewith. This in certain clutch constructions is formed by one or more radially contractable garter springs surrounding the series of sprags and engaging recesses therein with bearings positioned to rock each sprag on the inner raceway. However, when the clutch is revolving, centrifugal force in each sprag may either counteract or supplement the energizing means in accordance with the position of the center of gravity with respect to the center of curvature of the outer cam face. For most clutches it is desirable to have a construction of sprag in which centrifugal force is neutralized, neither increasing nor diminishing the energizing force. On the other hand there are certain clutch uses such as in an overrunning mechanism connected to the outer race member where it would be desirable to utilize centrifugal force for withdrawing the sprags from rubbing contact with the inner race member at some predetermined velocity of rotation.

It is the object of the invention to obtain a construction of sprag and method of forming the same by which the effect of centrifugal force thereon while in working position can be exactly predetermined. It is a further object to obtain this result starting with a sprag blank of a standard form and cross-sectional contour and from which all variations may be easily produced. With these objects in view, the invention consists in the construction and method as hereinafter set forth.

One type of sprag which has been used extensively in one-way clutches has a cross-sectional contour which might be generally described as a combination of a rectangle and a triangle. However, the opposite ends of the rectangular portion are actually eccentric curves while the triangular portion projects beyond these curves and has a rounded apex centrally therebetween. One important advantage of such a contour is that the same sprags may be used in clutches having raceways of different radii and consequently differing in the number of sprags forming a complement. Another advantage is that the centers of the curves may be located in any desired relation to the center of mass. Still another advantage is that the sprag blanks may be formed from a drawn rod of a desired contour cut into suitable lengths and without the necessity of further fashioning the curved surfaces. For forming my improved sprag the cross-sectional contour of the drawn rod preferably has the center of the curved face for engaging with the outer raceway so located with respect to the center of mass as to be substantially neutral. In other words, in working position centrifugal force will have little effect to turn the sprag one way or the other. Thus for general use in one-way clutches such sprags without alteration are suitable. If, however, it is desired to change the relation between the centers of curvature and the center of mass, this may be accomplished by cutting away a portion of the triangular projection. This makes it possible to form from the same stock and the same blanks cut therefrom, sprags having any predetermined moment of inertia for turning them in a direction counter to that produced by the energizing means. Consequently a oneway clutch may be formed in which at a predetermined velocity of rotation centrifugal force will withdraw the sprags from rubbing contact with the inner race member.

Figure 1:
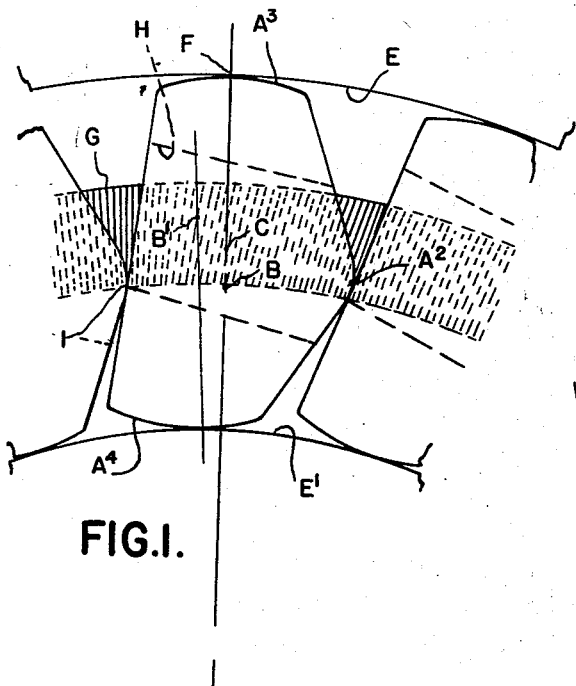
Fig. 1 is an elevation of a portion of a one-way clutch showing the sprags in relation to the raceways and also the energizing means therefor.

The specific blank A, preferably cut from a drawn rod as above described, has a substantially radially extending side A', a triangular projection at the opposite side having a rounded nose portion $A^2$ and eccentric arcuate opposite end portions $A^3$ and $A^4$ having their respective centers at B and B'. The center of gravity of the cross section is at point C. Fig. 1 illustrates the position of the sprag in a clutch, the axis of revolution of which is D and having the concentric raceways E and E' which are respectively in contact with the arcuate ends $A^3$ and $A^4$. It will be noted that the center of gravity C lies in a radial line from the axis D to the point of tangency F of the surface $A^3$ with the raceway E. Consequently the masses in the sprag on opposite sides of this line counter-balance each other and centrifugal force acting on the sprag will have no tendency to turn it either one way or the other.

For energizing the sprags, a radially contractable garter spring G extends through notches or channels H in the sprags having bearing at the point I at the left so as to bias the sprag to rotate anti-clockwise. This will bring both surfaces $A^3$ and $A^4$ into frictional contact with their respective raceways E and E' to effect instantaneous clutching when the inner surface E' is revolved clockwise.

Figure 4:
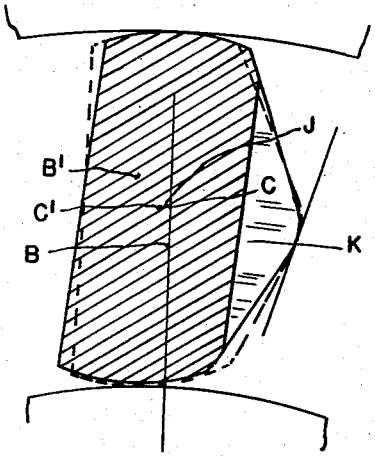
Fig. 4 is a cross-section through the sprag as in Fig. 3 in its relation to the raceways in released position.
Figure 2:
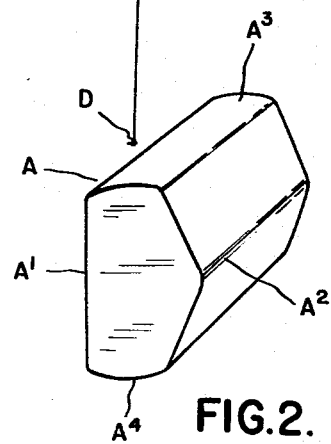
Fig. 2 is a perspective view of a polygonal blank from which the sprag is formed.
Figure 3:
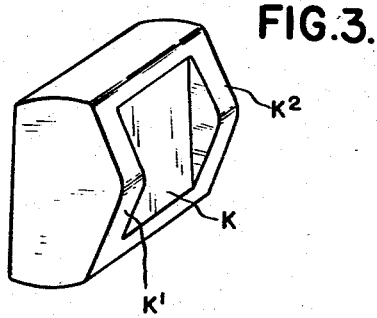
Fig. 3 is a perspective view of a sprag having a portion thereof cut away to change the location of the center of mass.

The construction just described is desirable for many, if not most, uses of the one-way clutch. If, however, it is desired to have a clutch which will automatically release the sprags from rubbing contact at a predetermined velocity of rotation, this may be accomplished as follows:

A portion of the triangular projection terminating in the nose portion $A^2$ may be cut away, as indicated at K, which will shift the center of gravity to the left as indicated at C', Fig. 4. This will make the mass to the left of the radial line D—F greater than that to the right of said line and will create a moment of inertia proportional to the length of a line J between the points C' and C. It is obvious that by removing a greater or lesser amount of the triangular portion, the length of the line J can be varied and the amount of centrifugal force developed at any predetermined velocity of rotation correspondingly changed. It is, therefore, only necessary to develop a centrifugal force which is in excess of the force of the energizing spring G, whereupon the sprag will be rotated clockwise to withdraw it from frictional contact with the inner race member. The cutting away of a portion as indicated at K will not alter the normal function of the triangular portion of the sprag as there will remain portions K' and $K^2$ at opposite ends. These will be sufficient to form contact with the face A' of an adjacent sprag as indicated in Fig. 1.

What I claim as my invention is:

1. A sprag for one-way clutches comprising a prismatic body having eccentric cam faces which are substantially diametrically opposite with respect to a longitudinal axis of the prism, and also having a body portion intermediate said faces projecting transversely a greater distance from said axis than the portion of the body diametrically opposite the same, said projecting portion only being variably cut away to selectively locate the center of mass with respect to said cam faces.

2. The method of forming sprags for one-way clutches with a selective location of the center of mass with respect to the working surfaces comprising forming a prismatic sprag body having eccentric cam faces diametrically opposite with respect to a longitudinal axis of the prism and also having a body portion intermediate said faces projecting transversely a greater distance from said axis than the portion of said body diametrically opposite the same and variably cutting away said projecting portion only to shift the center of mass to the desired location with respect to said cam faces.

3. The construction as in claim 1 in which the cut away portion extends only a part of the length of said prismatic body.

4. The construction as in claim 1 in which the cut away portion is between unaltered opposite end portions of said prismatic body.

5. The construction as in claim 1 in which said cam faces are eccentric arcs and said projecting portion is cut away to locate the center of mass in relation to the center of the arcuate face which forms the radially outer end of the sprag when in working position in the clutch.

6. In a one-way clutch of the type including spaced coaxial raceways respectively on relatively rotatable members, a series of sprags between said raceways and a radially contractable garter spring for energizing said sprags; each sprag being formed from a prismatic blank having eccentric arcuate opposite end faces for engaging the respective raceways and an eccentric projection from one side thereof variably cut away to selectively locate the center of mass with respect to the center of the outer arcuate end face so as to oppose the energizing force by centrifugal force to a degree which will withdraw the sprags from rubbing contact with the inner race member at a predetermined velocity of rotation.

References Cited in the file of this patent

UNITED STATES PATENTS

| | | |
|---|---|---|
| 1,952,461 | Roos | Mar. 27, 1934 |
| 2,385,799 | Dodge | Oct. 2, 1945 |
| 2,486,262 | Davis | Oct. 25, 1949 |

FOREIGN PATENTS

| | | |
|---|---|---|
| 637,610 | France | Feb. 6, 1928 |